3,092,769
MAGNETIC AMPLIFIER
William R. Miller, Erie, Pa., assignor to General Electric
Company, a corporation of New York
Filed Mar. 30, 1959, Ser. No. 802,802
1 Claim. (Cl. 323—89)

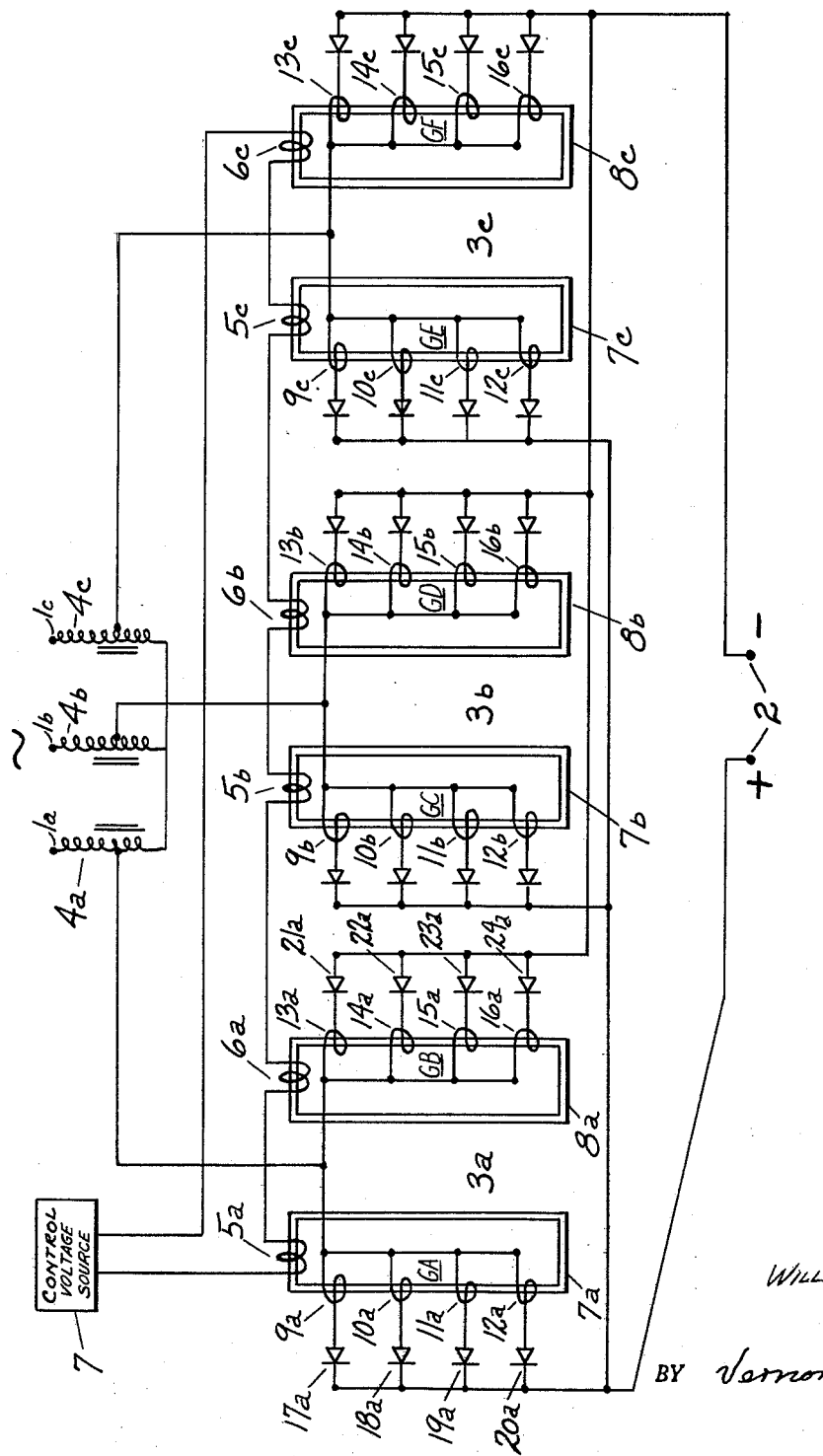

This invention relates to a magnetic amplifier adapted to supply a direct current load, through gate windings, from an alternating current source. Each gate winding comprises a plurality of gate winding legs. A rectifier is in series with each winding leg and all of the gate winding legs of each gate winding are arranged in parallel on a saturable core. By this arrangement, the gate winding legs of each gate winding cooperate to distribute and equalize the load on the rectifiers even though the individual rectifiers may have characteristics which do not match so that in the absence of the equalizing effect of the gate windings, one of the rectifiers might carry several times the current of the other.

In the drawing, the single FIGURE is a circuit diagram of a magnetic amplifier embodying the invention.

In the amplifier, alternating current from a polyphase power supply, not shown, is applied to alternating current input terminals $1a$, $1b$ and $1c$ and is converted into a direct current voltage of variably controlled magnitude at output terminals 2. The conversion is effected by saturable core reactors $3a$, $3b$, $3c$ respectively and associated circuitry. The reactors are arranged in each pulse of the power supply which might be supplied by auto transformers $4a$, $4b$, $4c$. The magnitude of the direct current voltage is controlled by the level of magnetic flux preset in the reactor cores by control windings $5a$, $5b$, $5c$, $6a$, $6b$, $6c$ fed from a control voltage 7. Each control winding is arranged to preset the level of magnetic flux in an associated saturable magnetic core $7a$, $7b$, $7c$, $8a$, $8b$, $8c$, respectively, and thereby to control the impedance of the gate windings mounted on each core. Referring specifically to the reactor $3a$, there is a four-legged gate winding GA comprising gate winding legs $9a$, $10a$, $11a$, $12a$ on the core $7a$ controlled by the control winding $5a$ and there is a four-legged winding GB comprising gate winding legs $13a$, $14a$, $15a$, $16a$ on the core $8a$ controlled by the control winding $6a$. The gate winding legs $9a$, $10a$, $11a$, $12a$ are respectively connected to the positive side of a load, not shown, across terminals 2 through rectifiers $17a$, $18a$, $19a$, $20a$, respectively, all having a common cathode connection. The rectifiers $17a$–$20a$ fire during the positive half cycle of the voltage supplied from terminal $1a$ through transformer $4a$ and supply a voltage to the load of a magnitude dependent upon the current in the control winding $5a$. The gate winding GB comprising gate winding legs $13a$, $14a$, $15a$, $16a$ is connected to the negative side of the load across terminals 2 through rectifiers $21a$, $22a$, $23a$, $24a$ respectively, which fire during the negative half cycle of the voltage supplied from transformer $4a$ and supply to the load 2 a voltage of magnitude controlled by the control winding $6a$. The reactors $3b$ and $3c$ are similarly connected and corresponding parts are indicated by the same reference numerals with the subscripts $b$ and $c$. There is a definite and substantially linear relationship between the magnitude of the direct current voltage at the output terminals 2 and the control voltage from source 7 supplying the control winding ampere-turns for the saturable magnetic cores $7a$–$8c$.

From the foregoing, it appears that on each of the cores $7a$–$8c$ there is a gate winding GA–GF, respectively, each comprising a plurality of gate winding legs. In series with each gate winding leg is a rectifier, the rectifiers being similarly poled and all having a mutually common electrode connection to either a source terminal or a load terminal. The rectifiers associated with each gate winding need not be matched in characteristics, as might be expected when rectifiers are normally connected in parallel, so that when the voltage across the rectifiers is necessarily equal, there is a proper division of load current through such parallel rectifiers. In such parallel rectifier arrangements one or more rectifiers, if all are not accurately matched, may carry several times the current of the others and therefore be seriously overloaded.

Since individual diodes vary in their forward voltage characteristics, current distribution between parallel connected diodes may vary widely unless the diodes are closely matched in these characteristics. For example, a silicon diode may have a threshold voltage energy level of .5 to .6 volt drop after which the current therethrough increases almost asymptotically with voltage and only a small percentage of the threshold voltage drop is due to the forward resistance of the diode. Furthermore, diode characteristics are changeable with age, temperature, and other conditions so that even diodes which have originally been matched to conduct substantially the same forward current at equal applied voltages may become unbalanced in their forward voltage-current characteristic after a short period of operation. However, because of the parallel connection of the gate winding legs in each gate winding, the current through the rectifiers is equally distributed so that individual rectifiers in the group are not overloaded. The uniform distribution of current through the rectifiers results from the substantially equal resistance of the gate winding legs in each gate winding which is substantially greater than the forward resistance component of its associated rectifier voltage drop. Not only does this arrangement result in uniform distribution of the current through the rectifiers, but it also blocks circulating currents between gate windings in the group due to slight differences in the windings. The load distributing function and the other advantages are obtained without the addition of any parts to the magnetic amplifier, and without the addition of load equalizing devices such as resistances in series with the paralleled rectifiers.

What is claimed as new is:

A magnetic amplifier for supplying direct current electrical energy of variably controlled magnitude to a load from an alternating current source comprising: a saturable magnetic core, a gate winding on said core serially connected between an alternating current input terminal and a direct current output terminal; said gate winding comprising a plurality of similarly poled gate winding legs of substantially equal resistance value, a rectifying element in series circuit with each of said gate winding legs, all of said rectifying elements being poled in the same direction with respect to said terminals, the resistance of each of said gate winding legs being substantially greater than the forward resistance of its associated series connected rectifying element; each of the rectifying element-gate winding leg series circuits being arranged in parallel to form said gate winding, the substantially equal resistance of said winding legs substantially equally distributing the load current between the rectifiers of said gate winding; and a control winding on said core arranged to conduct a direct current therethrough to control the magnetic flux density in said core to thereby control the magnitude of the direct current electrical energy supplied to the load.

References Cited in the file of this patent
UNITED STATES PATENTS 2,673,324 Burton et al. _____ Mar. 23, 1954
2,891,212 Bingham _____ June 16, 1959